Fig. 1
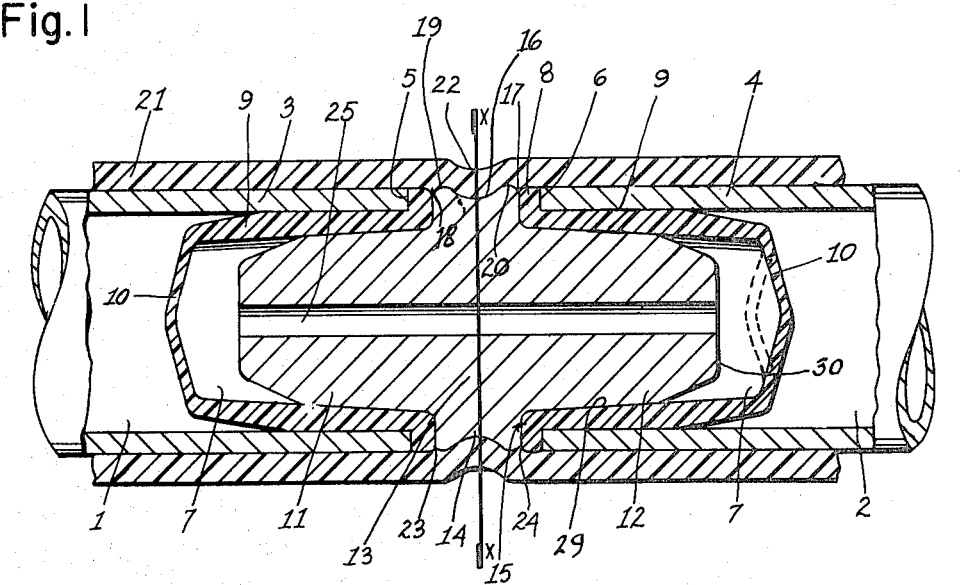
Fig. 2
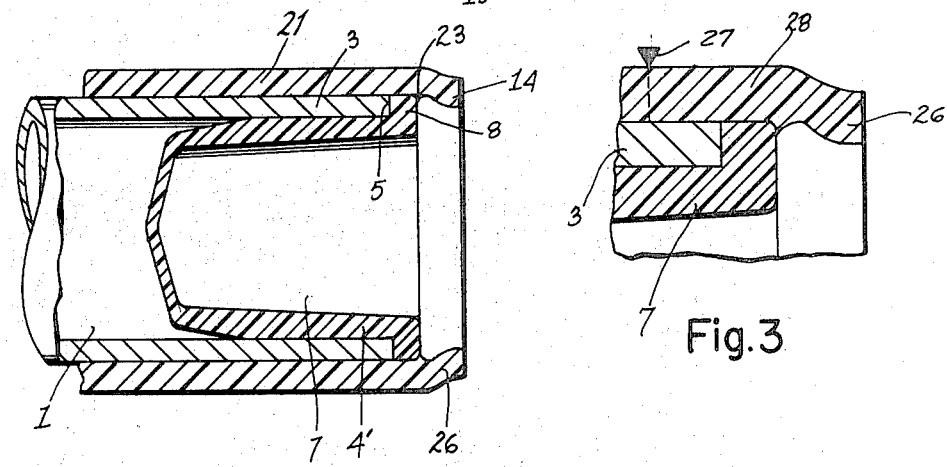
Fig. 3

United States Patent Office 3,776,993
Patented Dec. 4, 1973

3,776,993
METHOD OF MANUFACTURING TUBULAR ARTICLES
Wilhelm Lachenmayer, Berlebeck, Germany, assignor to Benteler-Werke AG, Schloss Neuhaus, Germany
Original application Oct. 10, 1969, Ser. No. 865,283, now Patent No. 3,661,184, dated May 9, 1972. Divided and this application Feb. 14, 1972, Ser. No. 225,878
Claims priority, application Germany, Nov. 26, 1968, P 18 10 957.4
Int. Cl. B28b 21/58, 21/72
U.S. Cl. 264—159            9 Claims

ABSTRACT OF THE DISCLOSURE

A method of manufacturing tubular articles wherein the open ends of a pair of elongated tubular members are closed by corrosion resistant inserts having flange portions overlying the radial end faces of the tubular members. The members are then aligned and surrounded by an insulating jacket provided with radially inwardly extending circumferential beads which abut against and are sealed to the respective flange portions of the inserts so as to fixedly secure the latter in the open ends, whereafter the jacket is severed between the beads thereof.

CROSS REFERENCE TO RELATED APPLICATIONS

The present application is a divisional application of the copending application Ser. No. 865,283, filed Oct. 10, 1969 now U.S. Pat. No. 3,661,184, issued May 9, 1972.

BACKGROUND OF THE INVENTION

The present invention relates to a tubular construction especially adapted for use in heat-and-water installation applications and which incorporates an elongated tubular member provided with a heat-and-sound insulating jacket and corrosion-resistant protective plugs received in the open ends of the elongated tubular member.

Tubular constructions are known in which the interior of a metal tubular member is sealed from the atmosphere by means of stoppers plugged into the open ends of the tubular member.

Such conventional stoppers, however, have the disadvantage that they insufficiently protect the respective end sections of the tubular member against physical damage, for example during storage and transportation thereof, and that they are too easily disconnectable from these end sections and are lost, for example during mechanical lifting of the tubular member at the plugged ends thereof, with the result that the interior of the metal tubular member then is subjected to corrosion due to atmospheric influences.

SUMMARY OF THE INVENTION

The object of the invention is to provide a method of manufacturing such a tubular construction and which comprises the steps of producing a pair of elongated tubular members having opposing open ends and a radial end face surrounding each of the open ends; closing each of the opposing ends with discrete corrosion resistant resilient insert means each including an annular portion overlying the respective radial and face; aligning the pair of tubular members and substantially juxtaposing the annular portions with a constriction therebetween; surrounding both of the tubular members with insulating jacket means, including the constriction between the tubular members; deforming the jacket means adjacent each of the annular portions of the insert means such as to obtain a pair of parallel radially inwardly extending circumferential beads each abutting against its respective annular portion so as to confine the same between the radial end face of the open end and the bead; heat welding the radially inwardly extending circumferential beads to their respective annular portions so as to constitute an airtight seal between the beads and their respective annular portions; and severing the jacket means intermediate the annular portions in the region of the constriction therebetween to thereby obtain two discrete insulated and hermetrically closed tubular elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 in part, shows a longitudinal cross-sectional view of opposing end portions of a pair of elongated tubular members, and illustrates the manner of manufacturing a plug construction for tubular members in accordance with the present invention;

FIG. 2 shows a part cross-sectional view of the end portion of a tubular member provided with a plug construction according to FIG. 1; and FIG. 3, in part shows a cross-sectional view of the sealing connection between the plug construction of FIG. 1 and an insulating jacket surrounding the tubular members of FIGS. 1 and 2.

DESCRIPTION OF THE PREFERRED EMBODIMENTS

Referring now to the drawings in which like reference numerals index like parts, and with attention initially directed to FIG. 1, a pair of axially aligned elongated tubular members 1 and 2, made of metal, such as steel, and for example continuously made, such as by drawing or any other conventional manner, are seen to comprise opposing end portions 3 and 4 each having a radial end face 5 and 6.

Pressed into the respective end portions 3 and 4 are identical substantially cup-shaped hollow plugs 7, made of a corrosion-resistant material, such as synthetic plastic. The plugs 7 are axially aligned in the direction of elongation of the tubular members 1 and 2, and each includes an open end with a circumferential flange portion 8 which surrounds the open end, a circumferential wall 9, and a bottom or end wall 10.

The flange portions 8 overlie the radial end faces 5 and 6 in abutting engagement and have an outer diameter which is substantially equal to the outer diameter of the tubular members 1 and 2.

The inner surfaces of the circumferential walls 9 are symmetrically conically tapered in direction toward the end walls 10 and are seen to be of a thickness considerably larger than the thickness of the end walls 10 which, preferably, are slightly tapered or curved in direction away from the open ends of the plugs.

In direction towards the end walls 10 and away from the open ends of the plugs, the outer surfaces of the circumferential wall 9 are slightly inwardly bent so as to facilitate insertion of the plugs into the respective open ends.

Interconnecting the tubular members 1 and 2, and pressed into the respective hollow interiors of the plugs 7, are opposite arms 11 and 12 of a symmetrical alignment and spacing member, generally indicated at 13. Intermediate the opposite arms 11 and 12 of the alignment and spacing member 13, is an annular circumferential enlargement 14 having side walls 15 in direction of which the tubular members 1 and 2 are axially moved till the flange portions 8 firmly abut against these side walls and are spaced from each other by a width corresponding to the width of the enlargement 14.

The arms 11 and 12 have circumferential walls 29 and end walls 30. As shown, the circumferential walls 29 are conically tapered to a degree substantially corresponding to the conicity of the inner surfaces of the plugs 7. However, towards the end walls 30, the arms 11 and 12 are more acutely tapered than the remainder of the circumferential wall so as to facilitate insertion of the arms into the respective plugs.

Due to their corresponding conicity, the arms 11 and 12 firmly press the adjoining wall portions of the plugs 7 against adjacent wall portions of the inner surfaces of the tubular members 1 and 2.

The enlargement 14 along its outer circumference, is arranged with a substantially inwardly curved groove 16 which arcuately extends across substantially the entire width of this outer circumference and forms a constriction in the same.

Flanking the groove 16 at opposite sides thereof, are additional circumferential grooves 17 and 18 which extend radially inwardly and are formed upon abutting engagement of the flange portions 8 with their respective said wall 15 of the enlargement 14 and are defined by the space in between the apices of the sloping ridges 19 and 20, which bound the width of the groove 16, and adjoining opposite portions of the outer circumference of the circumferential flange portions 8, as shown in the drawings.

The circumferential grooves 17 and 18 are shown as having a substantially triangular configuration, however, it will be understood that these grooves may have any other suitable shape.

The tubular members 1 and 2 thus closed by the plugs 7 and axially aligned and spaced with respect to each other by the alignment and spacing member 13, are then provided with an heat-and-sound insulating jacket 21, which preferably consists of a layer of synthetic plastic material applied over the circumference of the tubular members. The jacket and plug or insert means are both made of suitable material which are plastically deformable and weldable together by heat.

This application or deposition of the layer material is carried out under elevated temperature, preferably, and for example, in an extruder which has a nozzle portion through which a plurality of tubular elements, interconnected, aligned and spaced as hereinbefore described, are sequentially conveyed so as to obtain an overall even and tight adherence of the later material to the tubular members.

The jacket 21 is continuously applied over the axially aligned tubular members 1 and 2, including the transition between the flange portions 8 constituted by the enlargement 14.

During deposition of the layer material or jacket 21, a constriction 22 is formed therein at the location of the enlargement 14 as a result of the constriction formed by the groove 16 in the outer circumference of the enlargement.

Also by applying this layer over the circumference of the tubular members 1 and 2 and the transition therebetween, two parallel radially inwardly extending circumferential beads 23 and 24 are formed in the radially inwardly extending circumferential grooves 17 and 18. Due to the elevated temperature under which the jacket 21 is applied, the circumferential beads 23 and 24 are automatically welded to the adjoining portions of the flange portions 8 so as to form an hermetic seal between the plugs 7 and the jacket 21.

During passage of the respective tubular members through the nozzle of the extruder in order to be coated with the jacket 21, increase in volume of air occurs in the respective tubular members and the interiors of the plugs 7.

To this end, a pressure-equalizing channel 25 is provided in the alignment and spacing member 13. As shown, this channel 25 extends axially through the alignment and spacing member 13 and intercommunicates the respective interiors of the plugs 7.

Expansion of air in the tubular member 1 causes the thin end wall 10 of the left-hand plug 7 to bend inwardly in direction of the open end of the plug.

This pressure by the expanded air on the end wall 10, in turn, causes the air entrapped within the interior of the left-hand plug to flow through the channel 25 and into the interior of the right-hand plug.

Consequently, expansion of air in the tubular member 2 causes the thin wall 10 of the right-hand plug to bend inwardly as a result of which the air entrapped within the interior of this plug is caused to flow through the channel 25 and into the interior of the left-hand plug.

It will be appreciated, that even though only two tubular members have been illustratively and exemplary shown, it lies within the scope of the present invention that a great number of tubular elements may be interconnected, aligned and spaced relative to each other and provided wtih an insulating jacket and closure members in the manner as hereinbefore described.

It will further be appreciated that each tubular member is provided at both ends with plug members as hereinbefore described.

Following deposition of the layer material, the tubular members 1 and 2 are disconnected from each other by severing the jacket 21 along a path defined in the constriction 22 in the jacket and by subsequent removal of the arms 11 and 12 from their respective plugs 7.

The end product obtained is diagrammatically illustrated in FIG. 2.

Shown therein, is the end portion 3 of the tubular member 1 provided with the plug 7 whose flange portion 8 abuttingly overlies the radial end face 5. Locking the flange portion 8 in the position as shown, is the circumferential radially inwardly extending bead 23 of the jacket 21, which abuts against and is sealed with the adjoining portion of the flange portion 8.

In the manner described, the exterior surface of the tubular member is protected by the jacket 21 while the interior of the tubular member is protected against corrosion by the hermetic seal constituted by the flange portion 8 of the plug 7 and the bead 23.

In addition, the end portions of the tubular member have become shock-absorbent as a result of the substantially radially inwardly extending portions 26 of the jacket 21.

FIG. 3 illustratively shows the manner in which the plug 7 may be removed from the tubular member.

Prior to using the tubular member, for example prior to welding or soldering of the respective end portions, the jacket 21, at the location indicated by the arrow 27, may be circumferentially cut by a mechanical cutting device, such as a knife, saw or the like.

Removal of the end portion 28 of the jacket 21 permits subsequent removal of the plug 7 from the end portion 3 of the tubular member.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing a tubular article comprising the steps of producing a pair of elongated tubular members having opposite open ends and a radial end face surrounding each of said open ends; closing each of said opposite open ends with discrete insert means each including an annular portion overlying the respective radial end face; aligning said pair of tubular members and substantially juxtaposing said annular portions with spacing therebetween; surrounding both of said tubular members with insulating jacket means, including the transition between said tubular members; deforming said jacket means in the region of said spacing adjacent each of said annular portions of said insert means to thereby obtain a pair of parallel radially inwardly extending circumferential beads each abutting against its respective annular portion so as to confine the same between said radial end face and said bead, said jacket means and said insert means both being made of suitable materials which are plastically deformable and weldable together by heat; heat welding said pair of radially inwardly extending circumferential beads to the respective annular portions of said insert means so as to constitute an airtight seal between said annular portions and said circumferential beads, said deforming step and said heat welding step being carried out substantially simultaneously with said surrounding step; and severing said jacket means intermediate said annular portions to thereby obtain two discrete tubular elements.

2. A method as defined in claim 1, wherein each of said discrete insert means includes a cup-shaped portion received in the respective open end of said pair of elongated tubular members and extending in direction of elongation of said tubular members, and wherein said step of aligning said pair of tubular members comprises axially introducing into the respective cup-shaped portions of said insert means opposite ends of a rigid tubular alignment and spacing member provided with a radially extending enlargement intermediate said opposite ends, and axially moving said tubular members toward each other until said annular portions of said insert means abut against said enlargement at opposite sides thereof.

3. A method as defined in claim 2, wherein said cup-shaped portions and said opposite ends of said alignment and spacing member are correspondingly conically tapered.

4. A method as defined in claim 2, wherein said radially extending enlargement is provided with parallel axially extending surfaces, and wherein said annular portions extending surfaces but define therewith radically inwardly extending circumferential parallel grooves, and wherein said deforming step comprises forming said circumferential beads in said circumferential grooves.

5. A method as defined in claim 4, wherein said radially extending enlargement is provided with a circumferential groove, and wherein said severing step comprises severing said jacket means along said circumferential groove, and removing said alignment and spacing member from said tubular members following severance of said jacket means.

6. A method as defined in claim 2, wherein said step of surrounding both of said tubular members with insulating jacket means is carried out under elevated temperature, and wherein said alignment and spacing member includes an axially extending channel communicating the interiors of the respective cup-shaped portions of said insert means to equalize the pressure of the heat expanded air entrapped in said cup-shaped portions.

7. A method as defined in claim 6, wherein said alignment and spacing member is made of metal.

8. A method as defined in claim 6, wherein said insert means and said jacket means are made of a synthetic plastic material.

9. A method as defined in claim 6, wherein said cup-shaped portions includes an end wall and a circumferential wall adjacent said annular portion, and wherein said end wall is of a thickness substantially lesser than the thickness of said circumferential wall, said end wall being flexible in direction of elongation of said tubular members in response to expansion of an entrapped in said tubular members.

References Cited
UNITED STATES PATENTS 3,144,495  8/1964  Makowski _____ 264—248
3,200,984  8/1965  Fueslein et al. _____ 138—89 X ROBERT F. WHITE, Primary Examiner W. E. HOAG, Assistant Examiner U.S. Cl. X.R.

156—158, 159, 293, 303.1, 306; 264—163, 248